Figure 1:
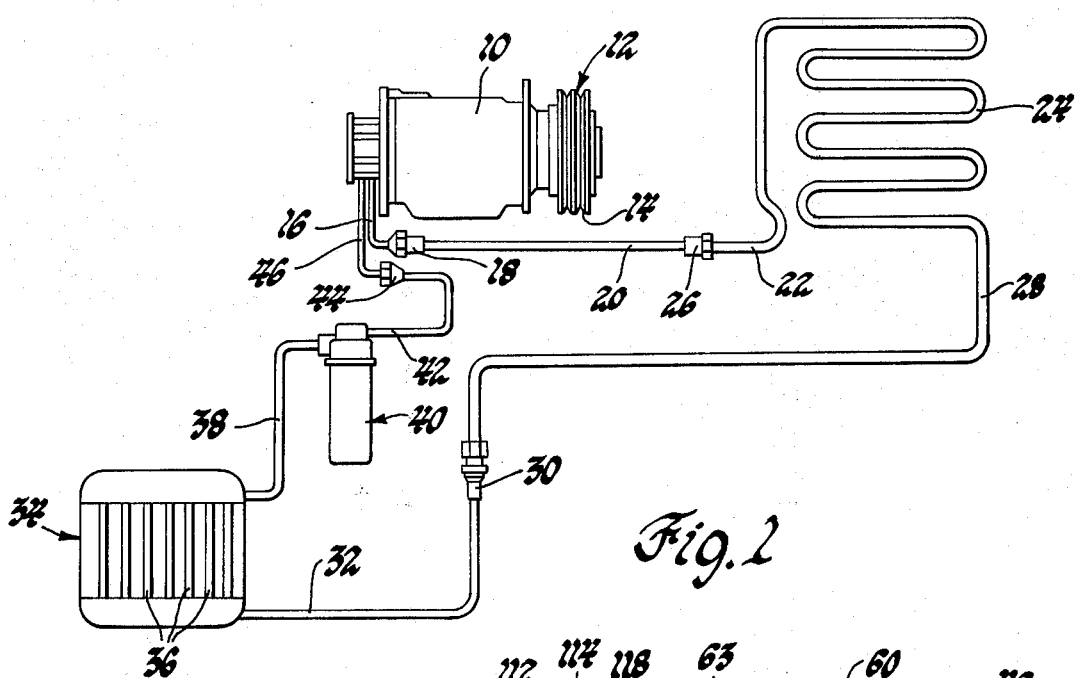

United States Patent [19]

Henkel

[11] 3,999,708
[45] Dec. 28, 1976

[54] FREEZE ELEMENT FOR A/C THROTTLING VALVE

[75] Inventor: Harry Donald Henkel, Dayton, Ohio

[73] Assignee: General Motors Corporation, Detroit, Mich.

[22] Filed: Aug. 11, 1975

[21] Appl. No.: 603,668

[52] U.S. Cl. .............................. 236/93 R; 62/217; 137/59; 236/98

[51] Int. Cl.² .................... H01M 4/72; F25B 41/04

[58] Field of Search ............, 62/217; 236/99 J, 98, 236/99 R, 93 A; 137/59–62

[56] References Cited

UNITED STATES PATENTS

| 2,453,851 | 11/1948 | Miller | 236/98 UX |
| 3,480,027 | 11/1969 | Noland | 137/59 |
| 3,798,921 | 3/1974 | Scherer et al. | 62/217 |

Primary Examiner—William E. Wayner
Attorney, Agent, or Firm—K. H. MacLean, Jr.

[57] ABSTRACT

A thermally responsive freeze type actuator for operating an air conditioning throttle valve. The actuator includes a rigid walled tubular portion which contains water and is attached to an axially extendable and contractible bellows portion. The bellows portion contains an immiscible fluid such as oil which floats on the water. The pressure forces created by the formation of ice in the tubular portion is transmitted to the oil by compression of one end of a hollow bladder member made of flexible material such as rubber which extends axially through the tubular portion and the bellows portion.

3 Claims, 2 Drawing Figures

U.S. Patent Dec. 28, 1976 3,999,708

FREEZE ELEMENT FOR A/C THROTTLING VALVE

This invention relates to an improved thermally responsive freeze actuator particularly adapted for operation of a throttling valve in an air conditioning system.

The invention concerns a valve actuator within an accumulator of an air conditioning system between the evaporator and the compressor. The actuator has a valve portion formed thereon which moves with respect to a valve seat in response to the movements of the actuator caused by the pressure of ice formation in the actuator. More specifically, the actuator includes an elongated and relatively rigid tubular portion which contains a quantity of water and which has an open end attached to a bellows portion with flexible walls which allows axial extension and contraction. The actuator encloses a quantity of oil or other immiscible fluid within the bellows portion. Also enclosed within the actuator is an elongated compressible bladder member which preferably is made of rubber. In a preferred embodiment, the bladder is thin-walled and contains a quantity of oil sealed within its interior. A member of solid rubber material may also be provided. In either case the volumetric compression caused by ice on one end causes corresponding volumetric expansion at the other end to pressurize oil in the bellows portion.

The provision of a compressible bladder member extending the length of the freeze type actuator efficiently transmits the compressive forces caused by ice formation to the oil in the upper portion of the actuator. In addition, the compression of the portion of the bladder which extends through the water absorbs radially directed pressure forces. These radially directed pressure forces may be of very large magnitude and might otherwise harm the rigid walls of the tubular portion.

The aforedescribed freeze type actuator provides a compact, efficient and simple unit which is desirable for use in an automobile air conditioning system. The decrease in stresses on the tubular portion of the actuator is desirable in extending the cycle life of the actuator. For more details concerning another embodiment of a freeze actuator within a liquid accumulator, reference is hereby made to the U.S. Pat. No. 3,798,921 to Shearer et al., which issued Mar. 26, 1974 and is assigned to the General Motors Corporation.

Other advantages of the improved freeze actuator valve will be more readily apparent from the following detailed description, reference being had to the accompanying drawing in which a preferred embodiment is clearly shown.

IN THE DRAWING

Figure 2:
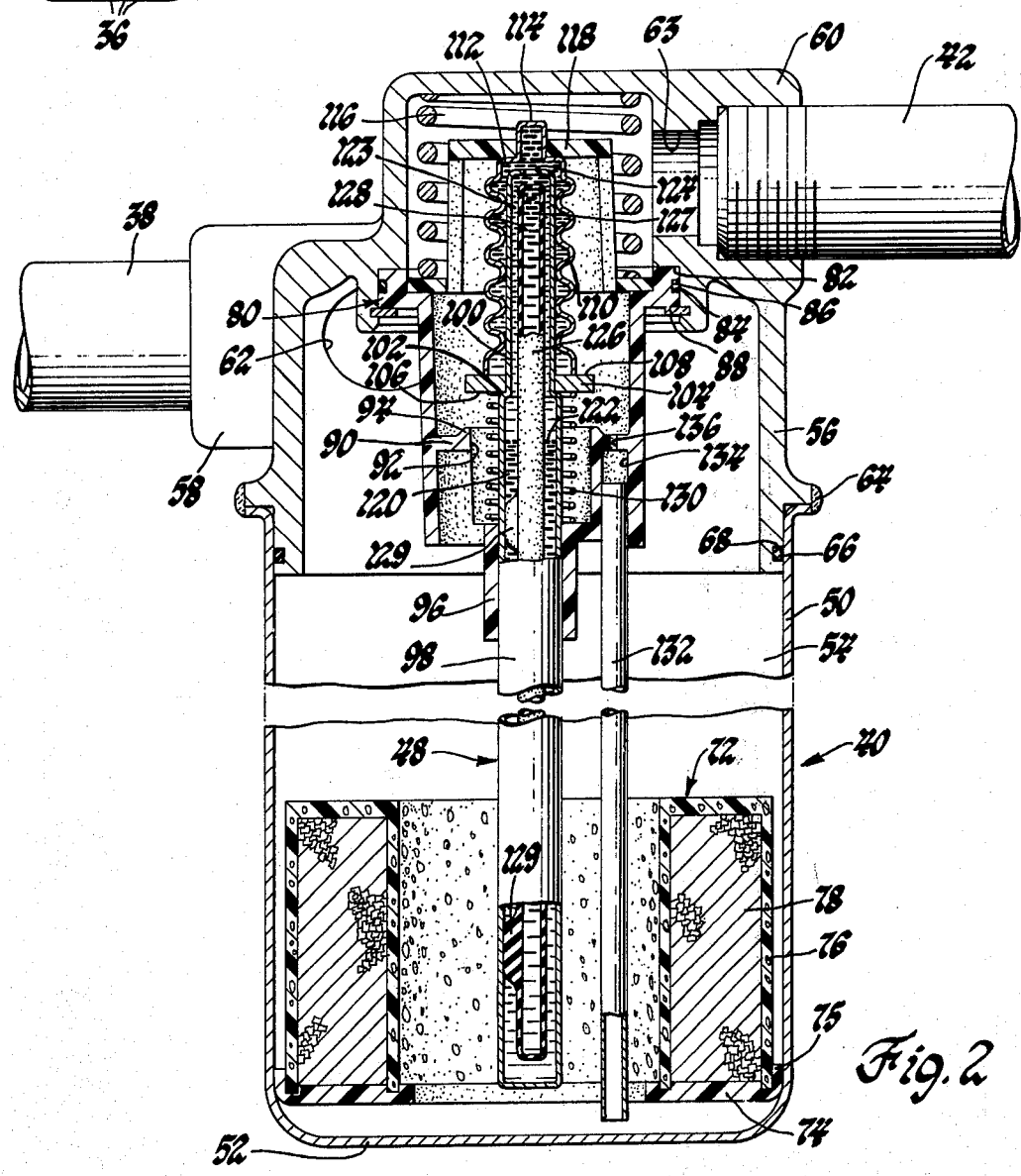

FIG. 1 is a somewhat schematic illustration showing an automobile air conditioning system; and FIG. 2 is a vertical sectioned view of the liquid accumulator shown in FIG. 1, in which the subject freeze actuator valve resides.

In FIG. 1 of the drawing, an air conditioning system including a refrigerant compressor 10 is illustrated. The shaft of compressor 10 is connected to a pulley assembly 12 which is rotated by the engine of the automobile through V-type belts (not shown) which engage grooves 14 of the pulley. The outlet 16 of compressor 10 is attached by connector 18 to a flexible hose 20 which is connected to the inlet 22 of the condenser 24 by the connector 26. The condenser 24 is most conveniently located in the front of the vehicle engine compartment so that it is exposed to a flow of air through the grill for cooling and liquifying warm refrigerant discharged from the compressor. Outlet 28 of the condenser 24 is fluidly connected to an orifice tube type expander 30 which decreases the pressure of liquid refrigerant discharged from the condenser. For more details of the structure of an orifice tube expander, reference is made to U.S. Pat. No. 3,815,379 to Shearer which issued June 11, 1974 and is assigned to the General Motors Corporation.

The orifice expander 30 is connected to the inlet 32 of an evaporator 34. Liquid refrigerant in the evaporator is vaporized or "boiled" in vertical passes or tubes 36, each having fluid conveying portions and exterior fin surfaces formed thereon. The evaporator 34 has an outlet 38 which is connected to an inlet of a liquid accumulator 40. The liquid accumulator 40 separates liquid from vaporous refrigerant and discharges the vaporous refrigerant through an outlet into a suction line 42. Suction line 42 is connected by fitting 44 to the inlet 46 of compressor 10.

When the automotive air conditioning system is operated under relatively low ambient temperature conditions, say about 70° F., the heat transferred from the relatively cool air flowing over the evaporator 34 is often insufficient to adequately vaporize the quantity of refrigerant pumped by compressor 10. The size and capacities of air conditioning components are normally designed to handle the cooling demands required for operation at high ambient temperatures. The operation under low ambient temperature conditions results in an accumulation of liquid refrigerant within the evaporator which will tend to decrease the evaporator internal pressure below a freeze level when frost begins to form upon the exterior surfaces of the evaporator. The subject freeze type throttle valve assembly 48 (see FIG. 2) within accumulator 40 moves to restrict refrigerant flow from the evaporator under these low temperature conditions and resultantly increases the pressure of the evaporator and the corresponding temperature of the refrigerant therein.

The accumulator 40 includes a cup-shaped member 50 with a closed bottom end 52 defining an interior space or chamber 54. An open upper end of the member 50 is covered by an end housing member 56 which has an inlet portion 58 connected to the evaporator outlet conduit 38. An outlet portion 60 of housing 56 is fluidly connected to the suction line 42 leading to the compressor. An inlet opening or port 62 in member 58 introduces refrigerant into the interior 54 from the evaporator 34. Refrigerant is discharged from space 54 through an outlet passage or port 63 in member 56. It then flows through the suction line 42 to the inlet 46 of compressor 10. An edge weld 64 between the members 56 and 50 prevents leakage of refrigerant from interior 54. Other suitable fastening means between the member 56 and 50 may be employed, such as brazing or bolting. An O-ring 66 within a groove 68 helps to seal the joint between the members.

A dessicant assembly 72 is supported in the bottom of the interior space 54 and includes support member 74 whose edge engages the interior surface of tubular member 50 at 75. An outer skin or container portion 76 made of fluid pervious material encloses a quantity of silica gel 78 to absorb moisture which may be mixed with the refrigerant.

The refrigerant temperature in the evaporator is controlled by settings of the freeze type throttle valve assembly 48 which is supported in space 54 by a valve seat member 80. An upper peripheral edge of member 80 engages a recess 82 formed within member 56. An O-ring 84 within a groove 86 prevents refrigerant leakage in bypass relation to the valve 48 and a radially expansive retainer 88 holds the valve seat member within recess 82. Valve seat member 80 includes a partition or wall 90 which has a passage 92 formed therein with an upwardly extending valve seat portion 94 encircling the passage 92 on the wall 90. Normally, vaporous refrigerant within the interior 54 flows through passage 92 to outlet 63 and hence through suction line 42 to compressor inlet 46. Liquid refrigerant settles to the bottom of the accumulator and is stored there until needed such as when leakage occurs or during operation under high ambient temperature conditions.

The valve seat member 80 includes a central portion 96 located upstream from passage 92. Portion 96 encircles and grippingly holds a cylindrical tubular portion 98 of the freeze type actuator 48 to permit it to reciprocate axially within the passage 92. The elongated tubular portion 98 of the freeze actuator 48 extends toward the bottom end 52 of accumulator 40 in good heat transfer relation to refrigerant in space 54 and has relatively thick and thereby rigid walls which are capable of withstanding considerable internal pressures. In the illustrated embodiment, the upper end portion 100 of the tubular member 98 is decreased in diameter to form a shoulder 102. An annular valve member 104 encircles the portion 100 at shoulder 102 and has a valving surface 106 normally spaced from the valve seat portion 94 to regulate refrigerant flow therethrough. The spacing between portions 94 and 104 is exaggerated in FIG. 2 for clarity and represents a wide open operative position. The upper surface 108 of the valving member 104 is attached to one end of a flexible member 110 made from relatively thin and ductile material whose side surface is corrugated in form to define a bellows-like member. The end 112 of the bellows includes an axially extended small diameter portion 114 adapted to be inserted in press fit relation through an opening within an over travel retainer member 118 which itself is yieldably pressed against the valve seat member 80 by an override spring 116. The smaller diameter portion of the tubular member 98 extends upward from shoulder 102 to form a bellows stiffener which impart axial support to bellows 110.

The elongated tubular portion 98 of the actuator 48 is filled with water 120 to level 122. Water is a convenient and desirable temperature control fluid because water and ice co-exist at 32° F. A non-freezing or lower freezing fluid which is immiscible with respect to water fills the interior space above level 122. An opening 124 communicates the interiors of the bellows 110 and the portion 100. A light oil within the bellows 110 has been found to be satisfactory.

Extending through the tubular portion 98 and the interior of bellows 110 is an elongated deformable member which may take the form of a soft, deformable rubber member or preferably, as shown in FIG. 2, a hollow member 126 with a rubber skin 127 and filled with oil or grease 128. The member 126 is closed at both ends so the oil or grease 128 is sealed therein. A plurality of radially extending fin means 129 extend from the skin 127 to center the member 126 in the actuator. During operation of an automobile air conditioning system in a relatively low ambient temperature environment, say 70° F., the compressor normally has an excess of pumping capacity relative to the cooling capacity of the evaporator 34. This means that more refrigerant is supplied to the evaporator 34 than can be continuously evaporated by the extraction of heat flowing over the evaporator. Resultingly, evaporator pressure will tend to decrease and the corresponding refrigerant temperature will tend to fall below 32° F. with the result of frost formation on the exterior evaporator surfaces. Under these conditions, the subject freeze type actuator will react to this decreasing temperature of refrigerant by formation of ice within the tubular portion 98. The formation of ice and resultant expansion pressurizes the oil 123 in the upper portion of the actuator. The expansion pressurizes the oil 128 within the flexible member 126 and transmits the pressure to the immiscible fluid in the bellows 110.

The pressurization in the bellows causes the corrugated side surfaces of the bellows to flex and provide axial extension which resultantly moves the valving portion 104 and tubular portion 98 downward against the force of a light valve return spring 130. Movement of portion 104 toward the valve seat 94 restricts refrigerant flow from the evaporator, thus raising the pressures therein increases the refrigerant temperature. Once ice is first formed within the tubular portion 98, the actuator 48 regulates fluid flow through passage 92 to maintain a 32° F. control temperature of refrigerant in space 54 and the evaporator on a low ambient temperature day. In the event that the valving member 104 engages the valve seat member 94 and more ice forms within the interior of portion 98, further extension of the bellows 110 causes upward movement of retainer 118 to compress the spring 116. This prevents damage to the bellows portion by excessive pressurization.

When valve surface 106 contacts seat 94 to stop refrigerant flow through passage 92, the flow of lubricating oil mixed with the refrigerant is prevented from returning to the compressor. To prevent this an oil pick-up tube 132 is provided with its upper end received in bore 134. A small orifice 136 in member 80 provides a pressure differential between portions of accumulator 40 upstream and downstream of closed valve passage 92 to draw oil from the bottom of container 50 to the suction line 42 and then to the compressor for lubrication purposes.

Although a preferred embodiment of the invention is illustrated and described in detail, other variations and modifications are possible still within the scope of the following claims which define the invention.

What is claimed is:

1. A freeze responsive actuator for moving a valve member in response to temperature changes characterized by its direct response to the temperature changes of a fluid which surrounds the actuator comprising: an elongated tubular portion with rigid walls and a closed bottom end for enclosing a quantity of water; an axially extendable and contractable bellows portion with a relatively flexible side wall in corrugated form attached to said tubular portion; said bellows portion having an interior filled with an immiscible fluid with respect to water and with a solidification temperature less than that of water; passageway means fluidly connecting the interiors of said tubular portion and said bellows portion to cause pressurization of said immiscible fluid and resultant axial extension of said bellows in response to expansion of said water resulting from ice formation; an elongated deformable member extending through the interiors of said tubular portion and said bellows portion immersed in said water at a first end portion and in said immiscible fluid at a second end portion; said deformable member having an axial length less than the interior axial dimension of said interconnected tubular member and bellows member and being unattached at either end portion thereto to permit unrestrained axial expansion of one portion of the elongated member as a second portion is contracted so that axial movement of said bellows portion is solely in response to the pressurization of said immiscible fluid and not by direct contact between the deformable member and the bellows portion; said deformable member being of a material such as rubber which is characterized by volumetric expansion and contraction of one end portion and corresponding simultaneous volumetric contraction and expansion of the other end portion, whereby pressure increases and decreases of water in said tubular portion particularly those caused by radial expansion of ice therein are efficiently transmitted to said immiscible fluid through said deformable member.

2. A freeze responsive actuator for moving a valve member in response to temperature changes characterized by its direct response to the temperature changes of a surrounding fluid comprising: an elongated tubular portion with rigid walls and a closed bottom end for enclosing a quantity of water; an axially extendable and contractable bellows portion with a relatively flexible side wall in corrugated form attached to said tubular portion; said bellows portion having an interior filled with an immiscible fluid with respect to said water and with a solidification temperature less than that of water; passageway means fluidly connecting the interiors of said tubular portion and said bellows portion to cause pressurization of said immiscible fluid and resultant axial extension of said bellows in response to expansion of said water resulting from ice formation; and elongated deformable member extending through the interiors of said tubular portion and said bellows portion immersed in said water at a first end portion and in said immiscible fluid at a second end portion; said end portions being unattached to the surrounding structure to permit unrestrained expansion thereof; said deformable member having a skin of resilient material, such as rubber, which encloses a sealed interior filled with an incompressible fluid, such as oil or grease, whereby compression of one end of said deformable member due to ice formation in said tubular portion is transmitted through said incompressible fluid to the other end of said deformable member to cause pressurization of said immiscible fluid and resultant expansion or contraction of said bellows.

3. A freeze responsive actuator for moving a valve member in response to temperature changes characterized by its direct response to the temperature changes of a surrounding fluid comprising: an elongated tubular portion with rigid walls and a closed bottom end for enclosing a quantity of water; an axially extendable and contractable bellows portion with a relatively flexible side wall in corrugated form attached to said tubular portion; said bellows portion having an interior filled with an immiscible fluid with respect to said water and with a solidification temperature less than that of water; passageway means fluidly connecting the interiors of said tubular portion and said bellows portion to cause pressurization of said immiscible fluid and resultant axial extension of said bellows in response to expansion of said water resulting from ice formation; an elongated deformable member extending through the interiors of said tubular portion and said bellows portion immersed in said water at a first end portion and in said immiscible fluid at a second end portion; said end portions being unattached to the surrounding structure to permit unrestrained expansion thereof; said deformable member having a skin of resilient material, such as rubber, which encloses a seated interior filled with an incompressible fluid, such as oil or grease, whereby compression of one end of said deformable member due to ice formation in said tubular portion is transmitted through said incompressible fluid to the other end of said deformable member to cause pressurization of said immiscible fluid and resultant expansion or contraction of said bellows; radially extending fin means integrally formed with said skin for centering said elongated deformable member within said actuator.

* * * * *